United States Patent [19]

Steinhilber

[11] Patent Number: 5,046,880
[45] Date of Patent: Sep. 10, 1991

[54] TELESCOPIC ADJUSTABLE SUPPORT

[76] Inventor: Helmut Steinhilber, Sonnenbergstrasse 40, CH-6052 Hergisil, Switzerland

[21] Appl. No.: 441,915

[22] Filed: Nov. 28, 1989

[30] Foreign Application Priority Data

Dec. 5, 1988 [DE] Fed. Rep. of Germany ....... 3840893

[51] Int. Cl.⁵ ............................................. F16B 1/00
[52] U.S. Cl. .................................................. 403/109
[58] Field of Search ............... 248/916, 918, 279, 278, 248/285, 286, 441.1, 447.2, 271, 125, 412; 403/109, 104, 377; 52/118, 632

[56] References Cited
U.S. PATENT DOCUMENTS 3,180,463  4/1965  Romek ................................. 52/632

Primary Examiner—Ramon O. Ramirez
Assistant Examiner—Robert A. Olson
Attorney, Agent, or Firm—Mason, Fenwick & Lawrence

[57] ABSTRACT

A telescopic adjustable support has telescopic arm members, with first and second axially spaced clamp parts in the larger arm member, one adjacent the outer end thereof and the other spaced inwardly therefrom. The outer clamp part has an arm member receiving spaces with upwardly facing wedge surfaces, and the inner clamp part having an arm member receiving space with downwardly facing wedge surfaces. An inner arm member passes through said clamp parts, and is locked when it is not in substantial alignment with said first arm member.

4 Claims, 2 Drawing Sheets

TELESCOPIC ADJUSTABLE SUPPORT

BACKGROUND OF THE INVENTION

The invention relates to a telescopic adjustable support in the form of an arm or rail.

Telescopic adjustable supports in the form of arms or rails are known, with numerous designs for a wide variety of applications. Swiss Patent 663,881 for example teaches the provision of office equipment such as keyboards and the like with such supports to permit changing their positions. This known telescopic extendable horizontal support is constructed to be as easy as possible to pull out and push in. When the device supported by the support is actuated or when certain actions need to be performed on an object supported by the support, forces act on the device and/or object which can lead to a pushing-in or pulling-out movement of the telescopic arm that is undesirable at this point in time. A locking screw is provided to prevent such undesirable changes in the length of the support. To pull the support out or to push it in, the locking screw must be loosened and retightened after the length adjustment has been made. This makes operation of the support inconvenient. German Utility Model 87 09 871 teaches a height-adjustable horizontal support for data processing equipment. The support has a telescopic section bent at an angle and engaging a guiding telescopic section inclined to the vertical. The weight acting on the support tilts the two telescopic sections with respect to one another, looking them automatically into any extended position. Lifting the support releases the lock and allows the height to be adjusted telescopically. No provision is made for adjusting the length of the support horizontally. In addition, the automatic lock known from German Utility Model 87 09 871 can be used only for relatively short telescopic sections, which are subjected to considerable mutual tilting caused by the tilting movement involved. In the case of a long horizontally extendable telescopic arm, as shown in Swiss Patent 663,881 for example, pushing the arm further inward produces only a minimal mutual tilting of the axes of the two interlocking telescopic parts, so that no automatic locking action occurs.

The goal of the invention is to provide a telescopic adjustable support in the form of an arm or track which automatically locks into any desired position when extended and, to avoid undesirable telescopic movement without additional manual actuation being required to lock and release the lock.

SUMMARY OF THE INVENTION

To make locking the horizontally extendable telescopic support easy for the user, the elements of the support in the form of an arm, which slide telescopically into one another, are equipped with a clamp insert permitting mutual locking of the arm members into any desired extended position. The arm members are locked in the clamp insert by the tilting movement created when the support is stressed. Locking therefore occurs whenever a load is placed on the support. To move the support telescopically once more, it is merely necessary to raise the free end of the support slightly to release the lock on the arm members. Since the end of the support must be raised to release the lock, inadvertent displacement of the telescopic support is prevented.

BRIEF DESCRIPTION OF THE DRAWINGS

The invention is described below with reference to one embodiment shown in the drawing.

DESCRIPTION OF THE PREFERRED EMBODIMENT

Figure 2:
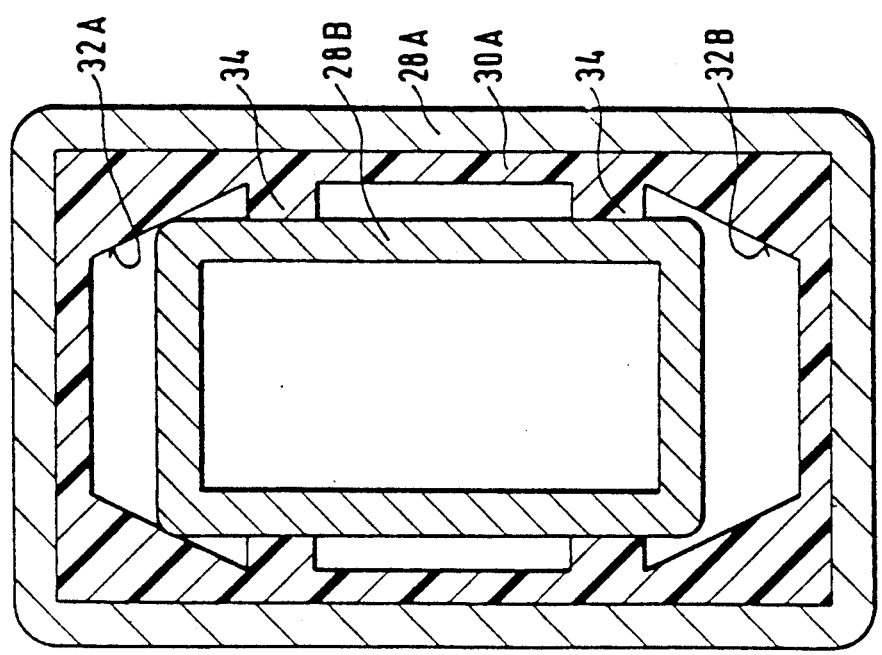
FIG. 2 is a section along line II—II in FIG. 1.
Figure 3:
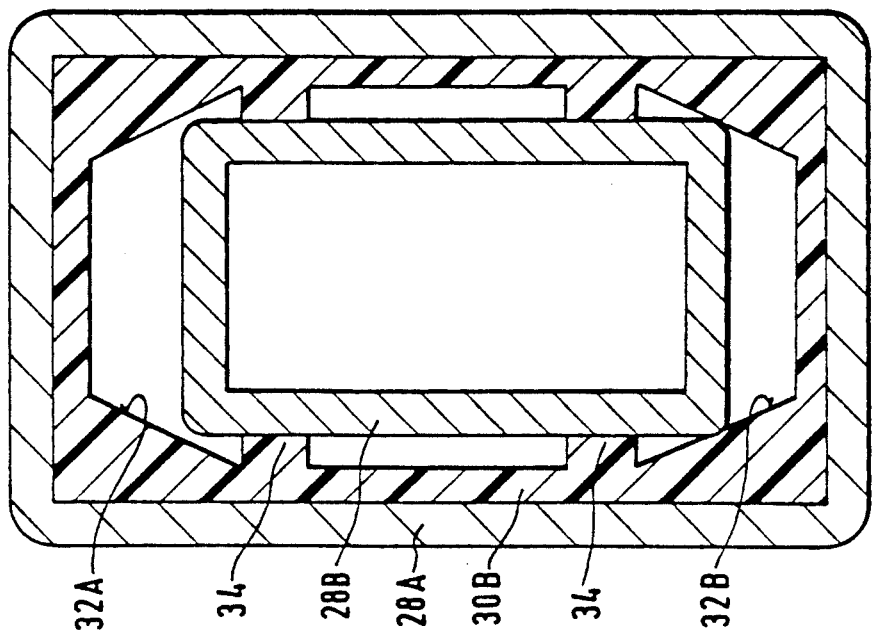
FIG. 3 is a section along line III—III in FIG. 1.

Support 16 comprises three arm members telescopically slidable into one another. Arm members 28A, 28B and 28C each have a square hollow profile with the cross sections sized so that they can be slid into one another with play. Within the outer end of each of the two outer arm members 28B and 28C, there are two clamp parts 30A and 30B which are axially spaced apart to serve as a clamp insert. As shown in FIGS. 2 and 3, clamp parts 30A and 30B surround intermediate arm member 28B which has a small cross section compared to arm member 28A, and which is guided in member 28A. Clamp parts 30A and 30B are each provided at top and bottom with a space for receiving support arm 28B, bounded respectively by downwardly and upwardly facing wedge surfaces 32A and 32B. Inwardly extending projections 34 are provided on the vertical sides of clamp parts 30, which projections slidably abut the vertical sides of surrounded arm member 28B.

When support 16 is pulled out telescopically, a tilting moment acts on arm members 28C and 28C because of their own weight. This tilting moment tilts the lengthwise axis of an inner guided arm member 28A, 28B, respectively slightly downward relative to the lengthwise axis of guiding outer arm member 28. As a result, the inner end of guided inner arm member 28B, 28C is moved upward in guiding outer arm member 28B, 28C, respectively, and are pressed against upper clamp wedge surfaces 32A of inner clamp part 30B, as shown in FIG. 2. In the vicinity of outer clamp part 30B, on the other hand, inner guided arm member 28B, 28C is forced downward against lower clamp wedge surfaces 32B as shown in FIG. 3. Inner arm member 28B, 28C is thus held with a slight tilt toward guiding outer arm member 28A, 28B at the top and firmly at the bottom in the clamp provided by parts 30A and 30B. Projections 34 also create a stable lateral support for inner arm member 28B, 28C.

Arm members 28B and 28C of support 16, being out of substantial alignment are thus wedged and locked automatically into any desired extended position, forming a stable support 16. To release the clamping action, it is merely necessary to raise the free outer end of support 16. This eliminates the slight tilt of arm members 28B and 28C, which are then in substantial alignment, and releases the clamp described above. Arm members 28B and 28C can then be slid easily with respect to one another.

Clamp parts 30 are all in the form of identical plastic plates, so that manufacture of the clamp insert is extremely inexpensive.

Figure 1:
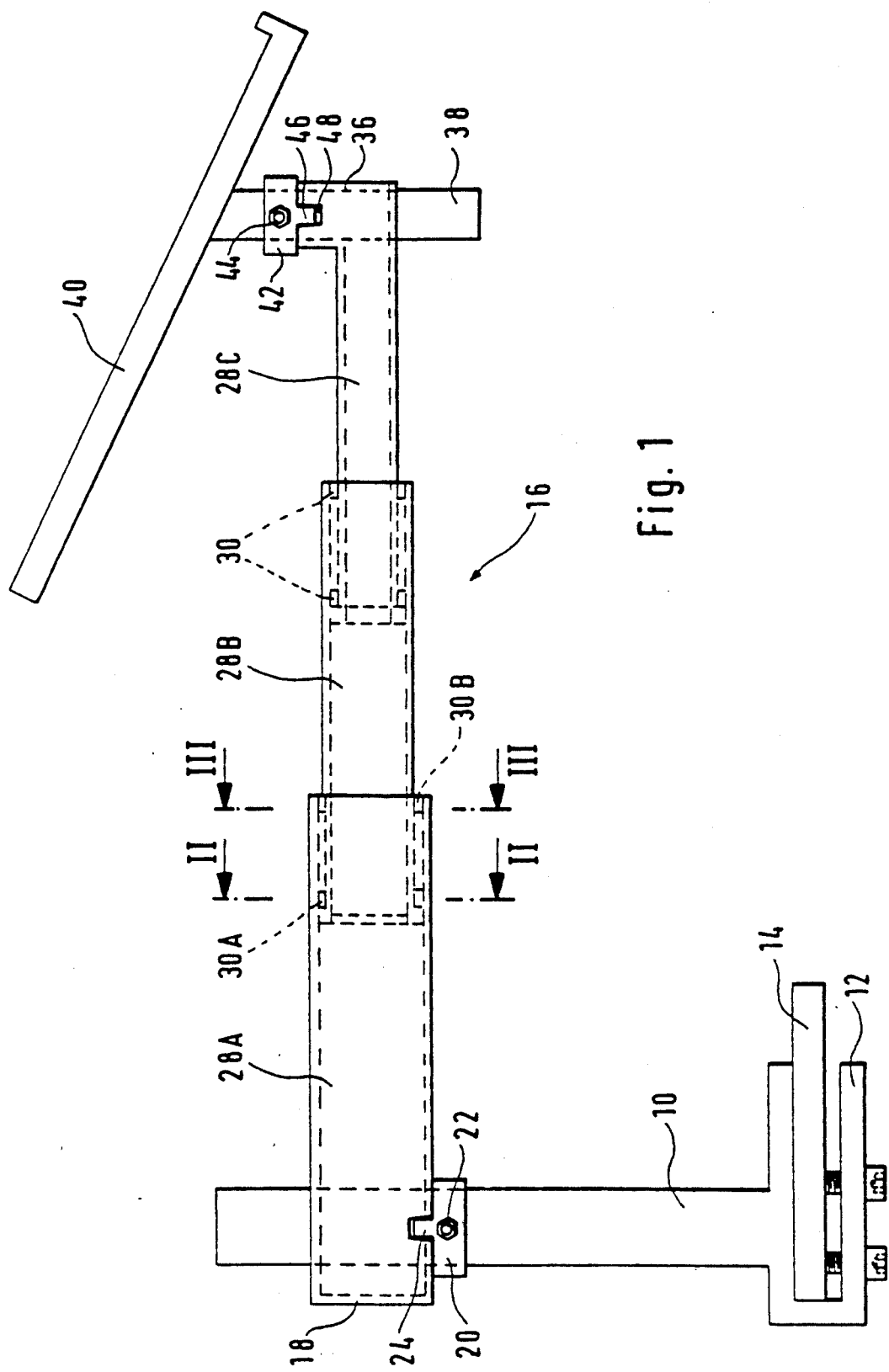
FIG. 1 is a side view of the support.

In the embodiment shown in FIG. 1, support 16 serves to hold a desk panel 40. Desk panel 40 is rotatably mounted at the free end of support 16 to turn about a vertical axis. For this purpose, desk panel 40 is mounted on a vertical support tube held in a vertical sleeve 36 at the free end of support 16. An adjusting ring 42 is located above sleeve 36 on support tube 38, said ring being axially displaceable and rotatable, and lockable by means of a screw 44. Adjusting ring 42 engages a recess 48 in sleeve 36 by a nose 46 to lock the desk panel at a selected angle of rotation.

Support 16 is horizontally pivotably mounted on a support column 10. For this purpose, the support has a sleeve-shaped end 18 surrounding support column 10. An adjusting ring 20 is adjustable along and rotatably on support column 10, and lockable by means of a screw 22. Adjusting ring 20 engages a recess in sleeve-shaped end 18 of support 16 by an upwardly directed nose 24, so that the support can be locked heightwise and anglewise by means of the adjusting ring. A clamping device 12 is mounted at the lower end of the support column to allow fastening support column 10 and hence support 16 and desk panel 40 to top 14 of a desk or work table.

I claim:

1. A telescopically adjustable support comprising:
a first arm member,
a second arm member telescopically positioned in said first arm member, and
means for locking said second arm member against telescopic movement in said first arm member when the arm members are out of substantial alignment and for permitting telescopic movement when said arm members are substantially in alignment, said means comprising a wedge surface on one said arm member engageable by the other said arm member when said arm members are out of substantial alignment.

2. A telescopically adjustable support comprising:
a first arm member having an outer end,
a second arm member telescopically positioned in said first arm member, and
means for locking said second arm member against telescopic movement in said first arm member when the arm members are out of substantial alignment and for permitting telescopic movement when said arm members are substantially in alignment,
said locking means comprising first and second axially spaced clamp parts in said first arm member, said first clamp part being relatively remote from said outer end and having an upper space with downwardly facing wedge surfaces for receiving said second arm member; and said second clamp part having a lower space with upwardly facing wedge surfaces for receiving said second arm member.

3. The telescopically adjustable support of claim 2, said first and second clamp parts being substantially identical.

4. A telescopically adjustable support comprising:
a first arm member,
a second arm member telescopically positioned in said first arm member, and
means for locking said second arm member against telescopic movement in said first arm member when the second arm member is tilted relative to said first arm member and for permitting telescopic movement when said arm members are substantially in alignment, said means comprising a wedge surface on one said arm member engageable by the other said arm member when said second arm member is tilted out of substantial alignment with said first arm member.

* * * * *